(12) United States Patent
Kim et al.

(10) Patent No.: US 11,976,164 B2
(45) Date of Patent: May 7, 2024

(54) METHOD OF PREPARING ORGANIC ZINC CATALYST AND METHOD OF PREPARING POLYALKYLENE CARBONATE RESIN BY USING THE ORGANIC ZINC CATALYST PREPARED THEREBY

(71) Applicant: LG CHEM, LTD., Seoul (KR)

(72) Inventors: Sung Kyoung Kim, Daejeon (KR); Seung Young Park, Daejeon (KR); Sang Cheol Shin, Daejeon (KR); Kyung Min Min, Daejeon (KR)

(73) Assignee: LG Chem, Ltd., Seoul (KR)

( * ) Notice: Subject to any disclaimer, the term of this patent is extended or adjusted under 35 U.S.C. 154(b) by 838 days.

(21) Appl. No.: 17/054,375

(22) PCT Filed: Dec. 20, 2019

(86) PCT No.: PCT/KR2019/018242
§ 371 (c)(1),
(2) Date: Nov. 10, 2020

(87) PCT Pub. No.: WO2020/130728
PCT Pub. Date: Jun. 25, 2020

(65) Prior Publication Data
US 2021/0246263 A1    Aug. 12, 2021

(30) Foreign Application Priority Data

Dec. 20, 2018 (KR) .................. 10-2018-0166050

(51) Int. Cl.
| | | |
|---|---|---|
| *C08G 65/14* | (2006.01) | |
| *B01J 37/02* | (2006.01) | |
| *B01J 37/04* | (2006.01) | |
| *C07F 3/06* | (2006.01) | |
| *C08G 64/02* | (2006.01) | |
| *C08G 64/34* | (2006.01) | |

(52) U.S. Cl.
CPC .............. *C08G 64/34* (2013.01); *B01J 37/02* (2013.01); *C07F 3/06* (2013.01); *C08G 64/02* (2013.01); *C08G 65/14* (2013.01)

(58) Field of Classification Search
CPC ........ C08G 65/14; C08G 64/02; C08G 64/34; B01J 37/04; C07F 3/06
See application file for complete search history.

(56) References Cited

U.S. PATENT DOCUMENTS

| | | |
|---|---|---|
| 4,981,948 A | 1/1991 | Kawachi et al. |
| 2005/0272904 A1 | 12/2005 | Moon et al. |
| 2013/0331544 A1 | 12/2013 | Dehghani et al. |
| 2014/0200328 A1 | 7/2014 | Brym et al. |
| 2016/0030929 A1 | 2/2016 | Joe et al. |
| 2016/0194442 A1 | 7/2016 | Kim et al. |
| 2016/0289379 A1 | 10/2016 | Kim et al. |

FOREIGN PATENT DOCUMENTS

| | | |
|---|---|---|
| CN | 1692135 A | 11/2005 |
| CN | 101402726 A | 4/2009 |
| CN | 105899290 A | 8/2016 |
| JP | 05507514 A | 10/1993 |
| JP | 2571269 B2 | 1/1997 |
| JP | 2012-20977 A | 2/2012 |
| KR | 1992-0002723 B1 | 4/1992 |
| KR | 10-2014-0062130 A | 5/2014 |
| KR | 10-2015-0050461 A | 5/2015 |
| KR | 10-2015-0055402 A | 5/2015 |
| KR | 10-2015-0058044 A | 5/2015 |
| KR | 10-2017-0006157 A | 1/2017 |
| KR | 10-2018-0043681 A | 4/2018 |
| KR | 10-2018-0060646 A | 6/2018 |

OTHER PUBLICATIONS

Zhong X et al., "Solvent free synthesis of organometallic catalysts for the copolymerisation of carbon dioxide and propylene oxide", Applied Catalysis B. Environmental, Elsevier, Amsterdam, NL, vol. 98, No. 3-4, Aug. 1, 2010 (Aug. 1, 2010), pp. 101-111, XP027134692 (11 Pages).

*Primary Examiner* — Caixia Lu
(74) *Attorney, Agent, or Firm* — Bryan Cave Leighton Paisner LLP

(57) ABSTRACT

The present disclosure relates to a method of preparing an organic zinc catalyst through solid phase blending that does not require a solvent and a washing process, and a method of preparing a polyalkylene carbonate resin by using the organic zinc catalyst prepared thereby.

12 Claims, No Drawings

METHOD OF PREPARING ORGANIC ZINC CATALYST AND METHOD OF PREPARING POLYALKYLENE CARBONATE RESIN BY USING THE ORGANIC ZINC CATALYST PREPARED THEREBY

CROSS-REFERENCE TO RELATED APPLICATIONS

This application is a National Phase entry pursuant to 35 U.S.C. § 371 of International Application No. PCT/KR2019/018242 filed on Dec. 20, 2019, and claims the benefit of and priority to Korean Patent Application No. 10-2018-0166050, filed on Dec. 20, 2018, in the Korean Intellectual Property Office, all of which are hereby incorporated by reference in their entirety for all purposes as if fully set forth herein.

TECHNICAL FIELD

The present invention relates to a method of preparing an organic zinc catalyst through solid phase blending that does not require a solvent and a washing process, and a method of preparing a polyalkylene carbonate resin by using the organic zinc catalyst prepared thereby.

BACKGROUND ART

Plastics are being used as raw materials for various articles due to ease of preparation and convenience of use, and are being used in various fields not only for disposable articles, such as packaging films, disposable cups, and disposable plates, but also for building materials and automotive interior materials. An amount of plastic waste increases as an amount of plastics used increases, and, since most plastics are not decomposed in the natural environment, the plastic waste is mainly treated by incineration, but there is a problem of causing environmental pollution because toxic gases are emitted during the incineration. Thus, biodegradable plastics, which are naturally degraded in the natural environment, have recently been developed.

Biodegradable plastics are plastics that are degraded slowly in water due to their chemical structure, wherein, in wet environments such as soil or seawater, the biodegradable plastics start to be degraded within a few weeks and disappear within one to several years. In addition, degradation products of the biodegradable plastics are less harmful to the environment because they are decomposed into harmless components, for example, water or carbon dioxide.

Particularly recently, a polyalkylene carbonate resin obtained by polymerization of an epoxide and carbon dioxide has been greatly spotlighted as a kind of biodegradable resin. Polyalkylene carbonate is an amorphous transparent resin, wherein it has only an aliphatic structure different from aromatic polycarbonate, a similar series of engineering plastics, and is synthesized by copolymerization of carbon dioxide and an epoxide, as direct monomers (main raw materials), in the presence of a catalyst. Polyalkylene carbonate is advantageous in that it has excellent transparency, elongation, and oxygen barrier properties, it has a biodegradable property, and it leaves no carbon residue by being completely decomposed into carbon dioxide and water during combustion.

Various methods for preparing the polyalkylene carbonate resin have been studied, and, particularly, an organic zinc catalyst, such as a zinc glutarate catalyst in which zinc and dicarboxylic acid are combined, i.e., a coordination compound-based catalyst for carbon dioxide plastic polymerization, is widely known as a representative catalyst for the copolymerization of carbon dioxide and an epoxide.

The organic zinc catalyst plays an important role in the copolymerization in such a manner that productivity in the preparation of the polyalkylene carbonate resin is determined by activity of the organic zinc catalyst.

The organic zinc catalyst is conventionally prepared by reacting a zinc compound with a dicarboxylic acid at a heated temperature in an organic solvent, such as toluene, removing the solvent, and washing, wherein, since catalyst particles formed by the reaction are in the form of fine powder having a diameter of a few μm or less, there are difficulties in the washing process. For example, a membrane is used during the washing to prevent loss of the catalyst, wherein, in a case in which pores of the membrane are small, the membrane pores are easily clogged, and, in a case in which the pores are large, a loss amount of the catalyst may increase.

Also, since the organic solvent used in the preparation of the catalyst is a component generally harmful to the human body and the environment and interest in environment-friendly technology has recently been increasing, the conventional catalyst preparation method has its limitations.

Japanese Patent Publication No. 2571269 (B2) discloses a technique of preparing a zinc-containing solid catalyst, which is used in the preparation of polyalkylene carbonate, by combining zinc oxide and an organic dicarboxylic acid in the absence of an organic solvent by a mechanical grinding means such as a ball mill and a vibration mill. However, since the catalyst prepared by the mechanical grinding means is broken into finer particles by grinding and thus easily scattered, there is a difficulty in using the catalyst and there is a limitation in that catalytic activity is also significantly reduced in comparison to that of a conventional catalyst prepared in the presence of an organic solvent.

Thus, there is a need to develop a technique for a method of preparing a catalyst which is environmentally friendly and is prepared without processing difficulties while exhibiting excellent catalytic activity.

PRIOR ART DOCUMENT (Patent Document) JP 2571269 B2

DISCLOSURE OF THE INVENTION

Technical Problem

The present invention provides a method of preparing an organic zinc catalyst through solid phase blending in the absence of an organic solvent.

The present invention also provides a method of preparing a polyalkylene carbonate resin by using the organic zinc catalyst.

Technical Solution

According to an aspect of the present invention, there is provided a method of preparing an organic zinc catalyst which includes: mixing a solid-phase zinc compound with a solid-phase dicarboxylic acid having 3 to 20 carbon atoms in the absence of an organic solvent, wherein the mixing is performed so that the zinc compound and the dicarboxylic acid react to generate water.

According to another aspect of the present invention, there is provided an organic zinc catalyst prepared by the above preparation method.

According to another aspect of the present invention, there is provided a method of preparing a polyalkylene carbonate resin which includes: polymerizing a monomer including an epoxide and carbon dioxide in the presence of the organic zinc catalyst.

Advantageous Effects

Since a method of preparing an organic zinc catalyst according to the present invention does not use an organic solvent and is performed by reacting a zinc compound with a dicarboxylic acid through solid phase blending, it is environmentally friendly and productivity may be excellent due to a simple process because a washing process is not required, and thus, an organic zinc catalyst exhibiting catalytic activity, which is equal to or better than that of a conventional organic zinc catalyst prepared in the presence of an organic solvent, may be prepared.

Also, since an organic zinc catalyst according to the present invention is prepared by the above preparation method through the blending, not by mechanical grinding, it may exhibit particle characteristics equivalent to those of the conventional organic zinc catalyst prepared in the presence of the organic solvent and catalytic activity may be excellent.

In addition, since a method of preparing a polyalkylene carbonate resin according to the present invention is performed by using the organic zinc catalyst, a polyalkylene carbonate resin may be easily prepared.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Also, terms and measurement method used in the present invention may be defined as follows unless otherwise defined.

TERMS

The term "tip speed" in the present invention denotes a speed occurring at an end of a stirrer, that is, a rotational speed measured at the end of the stirrer, wherein it is defined by the following Equation 1.

$$\text{Tip speed} = \pi D n \quad \{\text{Equation 1}\}$$

In Equation 1, D is a diameter (m) of the stirrer, and n is a rotational speed (revolutions per second, $s^{-1}$) of a mixer.

The term "Froude number (Fr)" in the present invention denotes a dimensionless ratio of inertia force to gravity force in the flow of a fluid, wherein it is defined by the following Equation 2.

$$Fr = v^2/gR \quad \{\text{Equation 2}\}$$

In Equation 2, v is a tip speed (m/s), g is acceleration of gravity, and R is a radius (m) of the mixer.

In mixing of solid-phase particles, in a case in which the Froude number is greater than 1.0, grinding may occur because particles may be broken by collision between the particles, and, in mixing using a conventional mechanical grinding means such as a ball mill, it is not possible to generate a condition in which the Froude number is 1.0 or less.

The present invention provides a method of preparing an organic zinc catalyst by solid phase blending.

The method of preparing an organic zinc catalyst according to an embodiment of the present invention includes mixing a solid-phase zinc compound with a solid-phase dicarboxylic acid having 3 to 20 carbon atoms in the absence of an organic solvent (step A), wherein the mixing is performed so that the zinc compound and the dicarboxylic acid react to generate water.

Step A is a step for preparing an organic zinc catalyst by reacting a zinc compound with a dicarboxylic acid, wherein it may be performed by mixing the zinc compound with the dicarboxylic acid in the absence of an organic solvent, and, in this case, both the zinc compound and the dicarboxylic acid are solid phases, the mixing may be solid phase blending, and the preparation method may be solid phase synthesis.

In the present invention, with respect to the preparation method, a catalyst is prepared by a reaction caused by the mixing of the zinc compound with the dicarboxylic acid in the absence of an organic solvent, wherein the expression "in the absence of an organic solvent" denotes that an organic solvent was not used in performing the preparation method, and, in addition, it may denote that any material capable of acting as a solvent, other than the zinc compound and the dicarboxylic acid, was not used.

In preparing a catalyst, a solvent is usually used so that a reaction occurs more easily by increasing a contact force between reactants used in the preparation of the catalyst, the solvent may thus affect a reaction rate, and a difference in properties (e.g., polarity) between the solvent and the reactant may be controlled to affect structural properties of the catalyst prepared.

Also, in a reaction, a catalyst generally plays a role in promoting the reaction, wherein catalytic activity may vary depending on structural properties of the catalyst. Thus, in consideration of the ease of the reaction and the activity of the catalyst prepared, a preparation method using a solvent has widely been used, and, with respect to an organic zinc catalyst prepared from a zinc compound and a dicarboxylic acid, a solution phase synthesis using an organic solvent has mainly been used. However, in the preparation of the catalyst using the solution phase synthesis, a washing process for separating catalyst particles from the organic solvent after the reaction is essentially required, there are difficulties, for example, the loss of the catalyst particles during the washing process or clogging of washing process equipment by the catalyst particles, and there is a limitation in that the organic solvent is harmful to the human body and the environment.

As a method for compensating for the limitation of the solution phase synthesis, a technique of preparing a zinc-containing solid catalyst from solid-phase zinc oxide and organic dicarboxylic acid in the absence of an organic solvent was attempted, wherein, in the technique, a mechanical grinding means, such as a ball mill, was used to provide a sufficient contact environment for causing a chemical reaction between the two solid-phase zinc oxide and organic dicarboxylic acid, a specific surface area was increased while catalyst particles prepared therefrom were broken into fine particles, and thus, it was expected that activity was excellent.

However, different from the expectation that the catalytic activity will be excellent because the catalyst particles are broken into fine particles by using the mechanical grinding means to thus increase the specific surface area, the catalytic activity is significantly reduced in comparison to that of the catalyst prepared by the solution phase synthesis, and, since the catalyst particles are easily scattered due to the fine particles, the use of the catalyst may be difficult, and thus, there is a difficulty in using the catalyst in practical industries. In a case in which the mechanical grinding means is used as described above, since the catalyst particles are broken into fine particles to affect a surface state of the particles, for example, crystallinity and surface exposure of a specific crystal plane, surface properties are changed, considerably different from those of the catalyst prepared by the solution phase synthesis, and thus, it is expected that the catalytic activity is significantly reduced due to the changes in the surface properties.

While the inventors of the present invention recognize that the catalytic activity may vary depending on the surface properties of the catalyst particles and have studied a method capable of preparing a catalyst having excellent activity and surface properties, which are similar to those of the catalyst prepared by the solution phase synthesis, without using an organic solvent, the present inventors found that a catalyst having similar structural properties, for example, physical properties, such as surface properties, to those of the catalyst prepared by the solution phase synthesis may be prepared through solid phase blending of a zinc compound and an organic dicarboxylic acid without using a mechanical grinding means, and a catalyst having excellent activity may thus be obtained while solving all problems arising from the solution phase synthesis, thereby leading to the completion of the present invention. Therefore, the preparation method according to the present invention has a very high technical value in the art.

Specifically, the mixing in the present invention may be performed so that the zinc compound and the dicarboxylic acid react to generate water. The zinc compound and the dicarboxylic acid are in contact with each other to generate water ($H_2O$) by a chemical reaction between molecules, the water may act as a solvent to improve the contact between the zinc compound and the dicarboxylic acid and increase reactivity between the molecules of the zinc compound and the dicarboxylic acid, and thus, the preparation method according to the present invention may easily prepare an organic zinc catalyst having excellent activity only through solid phase blending of the zinc compound and the dicarboxylic acid without using a separate organic solvent. That is, the mixing may include mixing of the zinc compound and the dicarboxylic acid to a level that induces the contact to such a degree that the zinc compound and the dicarboxylic acid may generate water. For example, the mixing may include stirring at a speed of 10 rpm or more to less than 1,000 rpm, for example, 100 rpm to 600 rpm.

Also, the mixing may be performed while performing nitrogen purging. The nitrogen purging in the present invention denotes that inert nitrogen is continuously or intermittently introduced into a reactor, in which the reaction takes place, to remove a component unnecessary for the reaction, wherein the mixing may generate water as described above, and, in a case in which the water is excessively generated, since the zinc compound and the dicarboxylic acid are agglomerated respectively or with each other to become a dough-like state before the zinc compound and the dicarboxylic acid sufficiently react to form the catalyst, the contact between the molecules is not possible, and thus, the catalyst may not be prepared. In a case in which the water is more excessively generated, since the mixture of the zinc compound and the dicarboxylic acid becomes a slurry or solution state, a washing process is required after the reaction, and thus, the problem of the washing process arising from the solution phase synthesis may not be solved.

Thus, the mixing of the present invention may require maintenance of an appropriate water content until the reaction is completed, and the water content may be controlled primarily by the mixing and secondly by the nitrogen purging. Herein, the nitrogen purging may be appropriately controlled so that the problem due to the water content as described above does not occur. For example, the nitrogen purging may be performed at a pressure of 0.01 $kg/cm^2g$ to 7 $kg/cm^2g$.

In an embodiment of the present invention, the mixing may be performed using a mixer equipped with a stirrer under a condition in which a tip speed of the stirrer is less than 1.0 m/s and a Froude number of the mixer is less than 0.25, and may be specifically performed under a condition in which the tip speed is 0.10 m/s or more to 0.35 m/s or less and the Froude number is 0.05 or more to 0.20 or less.

Herein, with respect to the mixer, known mixing methods and apparatuses may be freely used as long as they may homogeneously mix the zinc compound and the dicarboxylic acid, for example, the mixing may be performed using a stirring mixer, a V-type mixer, a W-type mixer, a ribbon mixer, or a drum mixer, and specifically, a U-shaped horizontal ribbon mixer may be used.

Also, a known stirrer may be used as the stirrer as long as the mixing may be performed under the above-described condition, for example, a paddle-type, single helical ribbon-type, or double helical ribbon-type may be used, and a double helical ribbon-type may specifically be used.

Furthermore, as another example, in terms of better homogeneous mixing, the mixing may be performed by adding a solid-phase dicarboxylic acid to the mixer and subsequently adding a solid-phase zinc compound. That is, a total amount of the dicarboxylic acid used in the preparation of the catalyst is first added to the mixer, a total amount of the zinc compound is subsequently added when the addition of the dicarboxylic acid is completed, and mixing may then be performed.

In general, a particle diameter of the dicarboxylic acid is a few tens of microns, for example, 35 μm, and a particle diameter of the zinc compound is 1 μm, wherein there is a considerable difference in the particle diameter. Thus, in a case in which the zinc compound having a small particle diameter is first added to the mixer, the large dicarboxylic acid particles subsequently added are difficult to penetrate between the zinc compound particles, and thus, it may be difficult to perform homogenous mixing.

Also, the mixing may be performed at room temperature, for example, 25±5° C., without a separate heat treatment.

Furthermore, the mixing may be performed for 60 minutes or more, and may be performed for 90 minutes or more in terms of preparing a catalyst with better catalytic activity.

Also, in the present invention, both the zinc compound and the dicarboxylic acid are solid phases, wherein the solid phase represents a solid state having a predetermined form without water, and may include all forms of solid phase, for example, powder or a crystal.

The zinc compound is not particularly limited as long as it is a zinc precursor capable of forming an organic zinc catalyst by reacting with a dicarboxylic acid, but may, for example, include at least one selected from the group consisting of zinc oxide (ZnO), zinc nitrate ($Zn(NO_3)_2$), zinc acetate ($Zn(CH_3CO_2)_2$), zinc hydroxide ($Zn(OH)_2$), zinc sulfate ($ZnSO_4$), and zinc chlorate ($Zn(ClO_3)_2$), and may specifically be zinc oxide.

Also, the dicarboxylic acid may be a dicarboxylic acid having 3 to 20 carbon atoms, may specifically include at least one selected from the group consisting of malonic acid, succinic acid, glutaric acid, adipic acid, pimelic acid, terephthalic acid, isophthalic acid, homophthalic acid, and phenyl glutaric acid, and may more specifically include glutaric acid.

Furthermore, the zinc compound and the dicarboxylic acid may be mixed in a molar ratio of 1:0.8 to 1:2. In this case, an organic zinc catalyst with better activity may be prepared.

In the method of preparing an organic zinc catalyst according to the embodiment of the present invention, a step of drying the prepared catalyst may be performed after step A, and the drying in this case, for example, may be performed for 30 minutes to 15 hours in a vacuum oven at a temperature of 60° C. to 130° C.

Also, the present invention provides an organic zinc catalyst prepared by the above preparation method.

Specifically, since the organic zinc catalyst according to the present invention is prepared by the above-described method, it may exhibit similar particle characteristics to those of the catalyst prepared by the conventional solution phase synthesis, and thus, it may exhibit excellent catalytic activity at a level similar to that of the catalyst prepared by the solution phase synthesis.

For example, the organic zinc catalyst according to an embodiment of the present invention has a particle size distribution of 0.3 μm to 1.2 μm, and may be plate-shaped crystalline particles.

In this case, the particle size distribution was measured by scanning electron microscopy analysis, and may specifically be measured using a SU-8020 FESEM under conditions of an accelerating voltage of 5 kV and an emission current of 10 μA.

In addition, the present invention provides a method of preparing a polyalkylene carbonate resin by using the organic zinc catalyst.

The preparation method according to an embodiment of the present invention is characterized in that it includes polymerizing a monomer including an epoxide and carbon dioxide in the presence of an organic zinc catalyst.

In the polymerizing of the monomer including an epoxide compound and carbon dioxide, the organic zinc catalyst may be used in the form of a heterogeneous catalyst.

Also, the polymerization may be performed by solution polymerization in an organic solvent, and thus, heat of reaction may be properly controlled to easily prepare a polyalkylene carbonate resin in which a molecular weight or viscosity is adjusted to a desired value.

As the organic solvent, for example, methylene chloride, ethylene dichloride, trichloroethane, tetrachloroethane, chloroform, acetonitrile, propionitrile, dimethylformamide, N-methyl-2-pyrrolydone, dimethyl sulfoxide, nitromethane, 1,4-dioxine, hexane, toluene, tetrahydrofuran, methylethylketone, methylamine ketone, methyl isobutyl ketone, acetone, cyclohexanone, trichloroethylene, methyl acetate, vinyl acetate, ethyl acetate, propyl acetate, butyrolactone, caprolactone, nitropropane, benzene, styrene, xylene, and methyl propasol, or a mixture of two or more thereof may be used, dichloromethane or dichloroethane may specifically be used, and, in this case, the polymerization may be more effectively performed.

The epoxide compound may include at least one selected from the group consisting of an alkylene oxide having 2 to 20 carbon atoms which is substituted or unsubstituted with halogen or an alkyl group having 1 to 5 carbon atoms; a cycloalkylene oxide having 4 to 20 carbon atoms which is substituted or unsubstituted with halogen or an alkyl group having 1 to 5 carbon atoms; and a styrene oxide having 8 to 20 carbon atoms which is substituted or unsubstituted with halogen or an alkyl group having 1 to 5 carbon atoms.

Specific examples of the alkylene oxide having 2 to 20 carbon atoms, which is substituted or unsubstituted with halogen or an alkyl group having 1 to 5 carbon atoms, may be ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, or allyl glycidyl ether.

Examples of the cycloalkylene oxide having 4 to 20 carbon atoms, which is substituted or unsubstituted with halogen or an alkyl group having 1 to 5 carbon atoms, may be cyclopentene oxide, cyclohexene oxide, cyclooctene oxide, cyclododecene oxide, alpha-pinene oxide, 2,3-epoxynorbornene, limonene oxide, or dieldrin.

Examples of the styrene oxide having 8 to 20 carbon atoms, which is substituted or unsubstituted with halogen or an alkyl group having 1 to 5 carbon atoms, may be 2,3-epoxypropylbenzene, styrene oxide, phenylpropylene oxide, stilbene oxide, chlorostilbene oxide, dichlorostilbene oxide, 1,2-epoxy-3-penoxypropane, benzyloxymethyl oxirane, glycidyl-methylphenyl ether, chloropenyl-2,3-epoxypropyl ether, epoxypropyl methoxyphenyl ether, biphenyl glycidyl ether, or glycidyl naphthyl ether.

The organic solvent, for example, may be used in a weight ratio of about 1:0.5 to about 1:100 relative to the epoxide compound, and may be appropriately used in a weight ratio of about 1:1 to about 1:10. In this case, if the ratio is excessively small at less than about 1:0.5, since the solvent may not function properly as a reaction medium, it may be difficult to take advantage of the benefits of the above-described solution polymerization. Also, if the ratio is greater than about 1:100, since a concentration of the epoxide is relatively decreased, productivity may be reduced and a molecular weight of the finally-formed resin may be reduced or a side reaction may be increased.

Furthermore, the organic zinc catalyst may be added in a molar ratio of about 1:50 to about 1:1000 relative to the epoxide. Specifically, the organic zinc catalyst may be added in a molar ratio of about 1:70 to about 1:600 or about 1:80 to about 1:300 relative to the epoxide compound. If the ratio is excessively small, it is difficult to have sufficient catalytic activity during the solution polymerization, and, in contrast, if the ratio is excessively large, it is not efficient due to the excessive amount of the catalyst used, a by-product may occur, or back-biting of the resin may occur due to heating in the presence of the catalyst.

A pressure of the carbon dioxide is not particularly limited, but may be preferably adjusted to 0.1 MPa to 20 MPa, 0.1 MPa to 10 MPa, or 0.1 MPa to 5 MPa in consideration of reaction efficiency. Particularly, the polymerization process, in which a polyalkylene carbonate resin is prepared by using the organic zinc catalyst of the present invention, is characterized in that only a predetermined amount of the carbon dioxide is injected in comparison to a conventional polymerization process in which carbon dioxide is continuously injected.

In addition, conventional polymerization conditions for preparing a polyalkylene carbonate resin may be used without limitation as the process conditions and method of polymerizing a monomer including carbon dioxide and an epoxide compound.

Hereinafter, the present invention will be described in more detail, according to specific examples. However, the following examples are merely presented to exemplify the present invention, and the scope of the present invention is not limited thereto.

Example 1

15.4 g (0.12 mol) of glutaric acid was added to a 250 ml round-bottom flask containing magnetic bars, and, after the completion of the addition, 10.6 g (0.13 mol) of ZnO was added. Thereafter, stirring was performed for 90 minutes while maintaining a tip speed of 0.22 m/s and a Froude number of 0.20 at room temperature (about 25° C.). Thereafter, the reaction product was recovered and dried in a vacuum oven at 130° C. to prepare a catalyst.

Example 2

2.43 kg of glutaric acid was added to a 5 L ribbon mixer (equipped with a double helical ribbon-type stirrer), and, after the completion of the addition, 1.50 kg of ZnO was added. Thereafter, stirring was performed for 60 minutes while maintaining a tip speed of 0.31 m/s and a Froude number of 0.20 at room temperature (about 25° C.). Thereafter, the reaction product was recovered and dried in a vacuum oven at 130° C. to prepare a catalyst.

Example 3

A catalyst was prepared in the same manner as in Example 2 except that stirring was performed for 90 minutes in Example 2.

Example 4

A catalyst was prepared in the same manner as in Example 1 except that nitrogen purging was performed at 0.3 kg/cm²g during the stirring in Example 1.

Example 5

A catalyst was prepared in the same manner as in Example 1 except that zinc oxide and glutaric acid were used in a molar ratio of 1:1.2 in Example 1.

COMPARATIVE EXAMPLE

⅓ of a volume of a 50 ml glass vial was filled with zirconia balls having a diameter of 1 mm, and 10.6 g (0.13 mol) of ZnO and 15.4 g (0.12 mol) of glutaric acid were ground and mixed by shaking at 200 rpm for 90 minutes at room temperature (25° C.). In this case, a critical speed of a ball mill was 306 rpm. Thereafter, the reaction product was recovered and dried in a vacuum oven at 130° C. to prepare a catalyst.

The critical speed is defined by the following Equation 3, wherein, since the vial rotated while the balls were attached to a wall of the vial at the critical speed, actual mixing was performed at 70% of the critical speed, and thus, particles were easily broken.

$$\text{Critical speed} = \frac{42.3}{\sqrt{D-d}} \quad \text{[Equation 3]}$$

In Equation 3, D is a diameter of the mill, and d is a diameter of the ball.

Reference Example 1

In a 250 ml round-bottom flask, 6.6 g (0.05 mol) of glutaric acid and 0.1 ml of acetic acid were added to 100 ml of toluene and dispersed under reflux. Subsequently, the dispersed solution was heated at a temperature of 55° C. for 30 minutes, and 4.1 g (0.05 mol) of ZnO was added to 50 ml of toluene and dispersed. 25% of the dispersion was first added to perform a reaction, 25% of the remaining 75% was added after 1 hour to perform a reaction, and the next 25% was further added after waiting for 1 hour to perform a reaction. Thereafter, after an additional hour has passed, the last 25% was added to perform a reaction. The mixed solution was heated at 110° C. for 2 hours. After a white solid was formed, the solid was filtered, washed with acetone/ethanol, and dried in a vacuum oven at 130° C. to prepare a catalyst.

Reference Example 2

1.50 kg of ZnO was added to a 5 L ribbon mixer (equipped with a double helical ribbon-type stirrer), and, after the completion of the addition, 2.43 kg of glutaric acid was added. Thereafter, stirring was performed for 60 minutes while maintaining a tip speed of 0.31 m/s and a Froude number of 0.20 at room temperature (about 25° C.) Thereafter, the reaction product was recovered and dried in a vacuum oven at 130° C. to prepare a catalyst.

Reference Example 3

A catalyst was prepared in the same manner as in Reference Example 2 except that stirring was performed for 90 minutes in Reference Example 2.

Experimental Example 1

Yield, catalyst particle characteristics, and unreacted ZnO of each catalyst prepared in the examples, the comparative example, and the reference examples were measured, and the results thereof are presented in Table 1 below.

(1) X-Ray Diffraction (XRD) Analysis

An amount of the unreacted ZnO in each catalyst was measured by XRD analysis.

Specifically, XRD was measured at room temperature (about 25° C.) using an X-ray diffractometer (Bruker D4 Endeavor, Germany) equipped with a monochromatic CuKα radiator (wavelength (v)=1.54 Å) operating at 40 kV and 30 mA. Diffraction patterns were measured in an angular range from 10 degrees to 50 degrees at a step of 0.02 degrees and a speed of 0.1 s/step in a 2θ scan mode.

(2) Catalyst Particle Characteristics

Catalyst particle characteristics were measured by scanning electron microscopy analysis.

A SU-8020 FESEM was used as a scanning electron microscope to check particle morphology of each catalyst under the conditions of an acceleration voltage of 5 kV and an emission current of 10 μA.

Also, a size distribution was checked by measuring sizes of the entire particles in a scanning electron microscope image of each catalyst, an average was obtained from the 30 particles among them, and a standard deviation was calculated.

TABLE 1

| Category | Unreacted ZnO amount (wt %) | Catalyst yield (%) | Catalyst particle characteristics | | |
|---|---|---|---|---|---|
| | | | Size distribution (μm) | Average (μm) | Standard deviation |
| Example 1 | <1 | 99.2 | 0.6~1.0 | 0.7 | ±0.3 |
| Example 2 | <1 | — | 0.4~3.0 | 0.8 | ±0.6 |
| Example 3 | <1 | 98.7 | 0.6~1.0 | 0.8 | ±0.2 |
| Example 4 | <1 | 98.8 | 0.5~1.0 | 0.8 | ±0.3 |
| Example 5 | <1 | 98.3 | 0.6~1.0 | 0.7 | ±0.4 |
| Reference Example 1 | <1 | 88.1 | 0.7~1.0 | 0.8 | ±0.3 |
| Reference Example 2 | 35 ± 4 | — | 0.4~5.0 | 0.9 | ±0.5 |
| Reference Example 3 | 28 ± 2 | 98.6 | 0.5~2.0 | 0.8 | ±0.3 |
| Comparative Example | <1 | 92.1 | 0.6~1.0 | 0.6 | ±0.1 |

Catalyst yield in Table 1 represents a ratio of a total amount of the dried catalyst finally obtained to a total amount of the raw materials used, wherein, with respect to Reference Example 1, yield was relatively low because unreacted raw materials and a portion of the prepared catalyst were lost while being subjected to filtration and washing processes for separating and removing the organic solvent after the reaction, and the amount of the unreacted ZnO was also small while being subjected to the additional filtration and washing processes.

In contrast, Examples 1 to 5 each had an amount of the unreacted ZnO, which was equivalent to that of Reference Example 1, despite the fact that the entire reaction product was recovered from the mixer without filtration and washing processes and dried while the process was relatively simple because the filtration and washing processes for separating and removing the organic solvent were not required, and each had a catalyst yield which was significantly increased by about 12% because there was no loss of the prepared catalyst. Also, Examples 1 and 3 to 5 had a narrow particle size distribution and good particle uniformity, and exhibited particle characteristics similar to those of Reference Example 1.

With respect to Reference Examples 2 and 3, the entire reaction product was recovered from the mixer and dried similar to Examples 1 to 5, wherein yields were as high as levels of the examples, but, since the reaction was not uniform, the amounts of the unreacted ZnO were very large and catalytic activities were significantly reduced in comparison to those of the examples as confirmed in Table 2 to be described later.

Experimental Example 2

A polyalkylene carbonate resin was prepared by using each of the catalysts prepared in Examples 1 and 3 to 5, Comparative Example, and Reference Examples 1 and 3, a resin content and catalytic activity were measured, and the results thereof are presented in Table 2 below.

In this case, with respect to the polyalkylene carbonate resin, 0.4 g of the catalyst and 8.5 g of dichloromethane were put in a stainless steel high-pressure reactor, and, after 10 g of ethylene oxide was then added to the reactor, polymerization was performed at 70° C. for 3 hours while injecting carbon dioxide into the reactor under a pressurized condition of 3 MPa. Thereafter, unreacted ethylene oxide and carbon dioxide were removed together with the dichloromethane, and the obtained resin content (g) was quantified to calculate catalytic activity per unit weight (g) of the catalyst.

TABLE 2

| Category | Resin content (g) | Catalytic activity (g-resin/g-catalyst) |
|---|---|---|
| Example 1 | 7.1 | 17.8 |
| Example 3 | 9.0 | 22.5 |
| Example 4 | 9.2 | 22.9 |
| Example 5 | 6.8 | 17.0 |
| Reference Example 1 | 11.9 | 30.0 |
| Reference Example 3 | 2.6 | 6.5 |
| Comparative Example | 0.1 | 0.25 |

As illustrated in Table 2, the catalysts of Examples 1 and 3 to 5 of the present invention respectively had catalytic activities which were significantly increased about 68 times to about 92 times that of Comparative Example.

The catalysts of Examples 1 and 3 to 5 respectively had catalytic activities which were reduced in comparison to that of the catalyst of Reference Example 1, but the catalytic activities were about 60% or more of the catalytic activity of Reference Example 1 and the catalysts of Examples 1 and 3 to 5 exhibited sufficiently good catalytic activities which may have an effective effect on the preparation of the polyalkylene carbonate resin.

From the above results, it was confirmed that the preparation method according to the embodiment of the present invention may prepare a catalyst having excellent activity while achieving a remarkably excellent effect on the productivity of the catalyst in comparison to the conventional solution phase synthesis.

Also, the catalysts of Examples 1 and 3 to 5 respectively had catalytic activities which were about 3 times that of the catalyst of Reference Example 3, and, from this, it was confirmed that it was easy to prepare a catalyst having excellent activity by adding and mixing the zinc compound after the addition of the dicarboxylic acid during the preparation of the catalyst.

The invention claimed is:

1. A method of preparing an organic zinc catalyst, the method comprising:
   mixing a solid-phase zinc compound with a solid-phase dicarboxylic acid having 3 to 20 carbon atoms in the absence of a solvent,
   wherein the mixing is performed so that the zinc compound and the dicarboxylic acid react to generate water, and
   wherein the mixing is performed by stirring using a mixer equipped with a stirrer under a condition in which a tip speed of the stirrer is less than 1.0 m/s and a Froude number of the mixer is less than 0.25.

2. The method of claim 1, wherein the mixer is a stirring mixer, a V-type mixer, a W-type mixer, a ribbon mixer, or a drum mixer.

3. The method of claim 1, wherein the mixing is performed by adding the solid-phase dicarboxylic acid to the mixer and subsequently adding the solid-phase zinc compound.

4. The method of claim 1, wherein the dicarboxylic acid comprises at least one selected from the group consisting of malonic acid, succinic acid, glutaric acid, adipic acid, pimelic acid, terephthalic acid, isophthalic acid, homophthalic acid, and phenyl glutaric acid.

5. The method of claim 1, wherein the zinc compound comprises at least one selected from the group consisting of zinc oxide, zinc nitrate, zinc acetate, zinc hydroxide, zinc sulfate, and zinc chlorate.

6. The method of claim 1, wherein the zinc compound and the dicarboxylic acid are mixed in a molar ratio of 1:0.8 to 1:1.2.

7. The method of claim 1, wherein the mixing is performed while performing nitrogen purging.

8. The method of claim 7, wherein the nitrogen purging is performed at a pressure of 0.01 kg/cm$^2$g to 7 kg/cm$^2$g.

9. The method of claim 1, wherein the mixing is performed at room temperature without a heat treatment.

10. A method of preparing a polyalkylene carbonate resin, the method comprising:
    polymerizing a monomer including an epoxide and carbon dioxide in the presence of the organic zinc catalyst prepared by the method of claim 1.

11. The method of claim 1, wherein the mixing includes stirring the zinc compound and the dicarboxylic acid at a speed of 10 rpm or more to less than 1,000 rpm.

12. The method of claim 3, wherein a particle diameter of the dicarboxylic acid is larger than a particle diameter of the zinc compound.

* * * * *